Patented June 7, 1949

2,472,684

UNITED STATES PATENT OFFICE 2,472,684

PROCESS FOR REMOVING CORROSION PRODUCTS FROM SURFACES CONTAINING HEAVY METALS

Carlo Rossi, Basel, Switzerland, assignor to Ciba Limited, Basel, Switzerland, a Swiss firm No Drawing. Application February 10, 1947, Serial No. 727,720. In Switzerland February 8, 1946

Section 1, Public Law 690, August 8, 1946
Patent expires February 8, 1966

8 Claims. (Cl. 252—105)

According to this invention metal oxides or metal salts, i. e. corrosion products, are removed from the surfaces of heavy metals or heavy metal alloys, which are resistant to alkalies, by treating the surface with an alkaline solution of an aromatic hydroxy-compound containing at least 2 adjacent hydroxyl groups, and which solution may advantageously also contain a reducing agent capable of converting iron in the ferric state into the ferrous state. By this treatment the metal oxides or meal salts are converted into water-soluble complex salts and a clean metal surface results, the metal or metal alloy being practically unattacked. The addition of a reducing agent of the aforesaid kind has the effect of rendering the cleaning process more rapid and more thorough.

As aromatic hydroxy-compounds of the kind described above there are suitable, for example, pyrocatechol, protocatechuic acid, gallic acid, and also naturally occurring compounds having 2 adjacent hydroxyl groups, such as quercetin, tannin, ellagic acid, and furthermore wood extracts or degradation products of lignin. Instead of gallic acid, mixtures containing gallic acid may be used, for example, those obtainable by the saponification of natural products containing gallic acid in combined form, such as tannin, sumach extract or gallnut. There may also be used mixtures which contain other aromatic hydroxy compounds of the aforesaid kind and which are obtainable by the degradation or saponification of natural products.

As reducing agents of the kind described above there may be mentioned, for example, alkali hydrosulfites or alkali hypophosphites. Alkali hydrosulfite and alkali hydrophosphite are examples of reducing agents which cause reduction from the ferric state to the ferrous state without the evolution of hydrogen.

Among the heavy metals which can be freed from coatings of metal oxide or metal salts by the process of the invention there may be mentioned iron, copper and silver. Among the heavy metal alloys brass may be mentioned.

The cleaning process of the invention may be carried out by treating the surface with an aqueous solution of the aromatic hydroxy compound containing an alkali, such as an alkali metal or alkaline earth metal hydroxide, ammonia, an amine, an alkali carbonate, an alkali bicarbonate, an alkali sulfide or an alkali silicate. Depending on the nature of the object to be cleaned and the thickness of the coating of metal oxide or metal salt the treatment may be conducted at room temperature or at a raised temperature, for example, at 100° C., and static or circulating baths may be used. It is also possible to apply the cleaning liquor in the form of a paste. For this purpose thickening agents, such as swollen alkali-lignin, cellulose ethers, gums, agar-agar, starch paste or dextrin, may be used. In order to retard the drying of such pastes they may contain further additions, for example, a higher alcohol or sulfite cellulose waste liquor. The use of pastes is especially suitable for removing rust from iron structures exposed to the atmosphere, such as the framework of bridges, lattice masts or cranes.

The solutions used in the process of the invention generally contain more than 0.1 per cent. of the aromatic hydroxy-compound, for example, 2–5 per cent.

The addition of the above mentioned reducing agent also has the effect of increasing the life of the cleaning preparations of the invention. The life of the solutions used in the invention can also be increased by covering them with a layer of a liquid which is sparingly soluble in water and advantageously of low viscosity, or by bringing them into action in hermetically closed vessels. As the activity of the aforesaid reducing agents may in time diminish, it is of advantage to add fresh quantities of these reducing agents to the cleaning solutions after prolonged use, the said agents being added, if desired, in admixture with substances of alkaline reaction in order to increase their efficacy.

The following examples illustrate the invention, the parts being by weight unless otherwise stated and the relationship of parts by weight to parts by volume being the same as that of the kilogram to the liter:

Example 1

Heavily rusted iron springs and iron tubes having a layer of rust up to 0.5 mm. thick are placed at room temperature in an alkaline bath which contains in 5000 parts by volume of water 200 parts by volume of caustic soda solution of 30 per cent. strength, 200 parts of pyrocatechol and 50 parts of sodium hydrosulfite, and the vessel is closed with a loosely fitting wooden closure. After a period of reaction of 5–24 hours, depending on the thickness of the oxide coating, the last traces of metal oxide are removed, and after rinsing the articles, they are in a completely clean state. The derusting bath may continue to be used until no more unconverted pyrocatechol remains in the bath. By acidification the pyrocatechol can easily be recovered from the exhausted bath.

Example 2

Heavily rusted pieces of iron bands are placed at room temperature in a solution of 50 parts of sodium hydroxide, 50 parts of gallic acid and 30 parts of sodium hydrosulfite in 1500 parts of water, and then the vessel is closed by means of a glass plate resting upon it. After a period of reaction of 3–24 hours the pieces of iron are completely clean after being rinsed with water. The gallic acid can be removed by acidification from the red complex salt formed during the derusting process.

Example 3

Pieces of iron plate and bolts heavily rusted by weathering are placed in a solution containing in 2000 parts by volume of water 50 parts of sodium hydroxide, 50 parts of tannin and 40 parts of sodium hydrosulfite, and the vessel containing the bath is closed with a loosely fitting closure. After a reaction period of 1–30 hours, depending on the thickness of the oxide coating, the articles can be withdrawn from the cleaning bath free from all traces of metal oxide. In the case of very heavy rusting the period of the cleaning treatment is extended to a few days.

Example 4

A paste which consists of 20 parts of pyrocatechol, 20 parts of sodium hydrosulfite, 5 parts of caustic soda, 20 parts of glycerine and 200 parts of aqueous swollen alkali-lignin of 20 per cent. strength, is applied to a rusty iron bar in a thickness of ½–1 cm. After 5–6 hours the paste can be removed by washing. The iron bar so treated is free from all traces of rust.

Example 5

The tank of a motor car, which has become heavily rusted in the interior owing to prolonged standing of the vehicle, is charged ⅔ full with an aqueous solution containing dissolved therein 10 per cent. of gallic acid, 10 per cent. of calcined sodium carbonate and 5 per cent. of sodium hydrosulfite, and after being closed the tank is agitated for one day on a rocking device. The tank is in a clean state after being rinsed with water and dried with air.

Example 6

Tannin is saponified by means of an aqueous solution of caustic soda having an addition of 0.5 per cent. of sodium hydrosulfite, and then the saponified solution is rendered weakly acid to litmus by means of a mineral acid. By the addition of a concentrated solution of sodium chloride the crystalline sodium salt of gallic acid is precipitated. The latter is washed on a suction filter with a concentrated solution of sodium chloride, and dried at 80–90° C. under reduced pressure.

10 parts of the salt so obtained are mixed with 10 parts of calcined sodium carbonate and 3 parts of sodium hydrosulfite and dissolved in 200 parts by volume of water. The resulting solution is introduced into a beaker and a heavily rusted key is placed therein without covering the beaker. After allowing to stand for 20 hours and rinsing it with water the key is free from rust.

Example 7

10 parts of the product of the saponification of tannin obtained as described in Example 6, 10 parts of calcined sodium carbonate and 2 parts of sodium hydrosulfite are dissolved in 100 parts by volume of water. The solution is introduced into a beaker, and a copper plate having a heavy coating of verdigris, is placed in the solution. After allowing the plate to remain for 15 hours in the solution in the open vessel all the verdigris has been removed.

Example 8

A brass pipe which has a heavy coating of verdigris and has a nickel coating which has partly scaled off is suspended in a bath prepared in the manner described in Example 6, and the bath liquor is then covered with a thin layer of spindle oil. After two days the tube can be removed from the bath. After cleaning it for a short time with a wet rag the tube is obtained in a clean condition free from all traces of verdigris.

Example 9

A silver spoon, of which the bright surface has dark patches of corrosion thereon is placed in a bath prepared as described in Example 6. The patches of corrosion disappear after about 4–6 hours and after being rinsed with water and dried the whole surface of the spoon has the bright lustre of silver.

Example 10

20 parts of the product of the saponification of tannin obtained as described in Example 6, 10 parts of calcined sodium carbonate and 5 parts of sodium hydosulfite are dissolved in 200 parts by volume of water, and after introducing rusty nails and rusty screws the solution is heated at the boil in a reflux apparatus for ¼ hour. The batches are then thoroughly rinsed with cold water and obtained free from all rust.

Example 11

20 parts of crude sodium gallate (obtained by the alkaline saponification of tannin as described in Example 6) 20 parts of calcined sodium carbonate and 4 parts of hydrazine sulfate are dissolved in 200 parts by volume of water. A piece of rusty iron lattice-work is suspended in the solution for 24 hours, and then rinsed with water. In this manner the iron lattice-work is obtained in a clean state free from all rust. The clean metal suffers no atack by prolonged immersion in the derusting bath.

In order that the bath may retain its derusting capacity for several weeks about 0.5 per cent. of one of the ordinary wetting agents is added and the bath is covered with a thin layer of oil.

Example 12

A mixture of 10 parts of gallic acid, 10 parts of calcined sodium carbonate, 5 parts of sodium hypophosphite and 0.5 part of sodium diisobutyl-naphthalene sulfonate is dissolved in 200 parts by volume of water, and the solution is covered with a thin layer of spindle oil.

Iron articles coated with rust and immersed for 4–24 hours in the above solution can be removed from the bath in a clean state free from all rust. After rinsing the articles with water they are dried and greased as a protection against fresh corrosion.

Example 13

20 parts of gallic acid are dissolved with 20 parts of calcined sodium carbonate in 200 parts by volume of water, and then a heavily rusted iron tube is placed in the solution in an open vessel. After standing for 10 hours at room temperature all the rust is dissolved and the tube can be rinsed clean with cold water.

*Example 14*

10 parts of pyrocatechol, 10 parts of calcined sodium carbonate and 3 parts of sodium hydrosulphite are dissolved in 200 parts by volume of water. The solution is introduced into a beaker, and a heavily rusted metal screw having a nut thereon is suspended in the solution. The derusting solution is allowed to stand for 20 hours without a covering over it. At the end of this period all the rust is dissolved, and the nut which was previously difficult to move can now be easily rotated upon a screw.

*Example 15*

20 parts of sulfogallic acid, which may be prepared for example in the manner described in German specification No. 74,602 are dissolved together with 20 parts of calcined sodium carbonate and 5 parts of sodium hydrosulfite in 200 parts by volume of water, and then a rusty tin opener is placed in the solution so obtained. After standing quiescent in the solution in an open bath for 16 hours the tin opener is obtained in a clean state.

*Example 16*

A derusting bath is prepared in the manner described in Example 6, with the exception that there is used, instead of the saponified tannin described therein, one of the saponification products described below under (a) or (b):

(a) 40 parts by volume of a caustic soda solution of 33 per cent. strength to which have been added 2 parts of sodium hydrosulfite, are mixed in a closed flask fitted with a stirring mechanism with 60 parts of pulverized sumach extract, while strongly stirring. The temperature of the reaction mixture rises spontaneously to 50° C., and then it is heated with the exclusion of air for 1 hour at 90–95° C. By the addition of 6.5 parts by volume of sulfuric acid of about 93 per cent. strength the reaction mass is rendered weakly acid to litmus, and then poured into a porcelain dish. Upon cooling the viscous reaction mass solidified to form a pale brown solid cake, which is ground after being dried at 60–70° C. under reduced pressure, 83 parts are obtained. The ground product is suitable for preparing derusting powders.

(b) 50 parts of finely pulverized gallnut are strewn with the exclusion of air into 50 parts by volume of caustic soda solution of 39 per cent. strength while strongly stirring. A thick dark colored magma is formed of which the temperature rises spontaneously to 70° C. The whole is then stirred with the application of heat for 1 hour at 70–80° C., and then the reaction mass is rendered weakly acid to litmus by the addition of 8 parts by volume of concentrated sulfuric acid. The mass while still hot is then poured into a porcelain dish, and soon solidifies to a hard cake. After drying it at 70–80° C. for about 16 hours the product is ground.

*Example 17*

A derusting powder suitable for producing derusting liquors is prepared in the following manner:

100 parts of finely pulverized gallnut are added, while thoroughly stirring, to 200 parts by volume of caustic soda solution of 16 per cent. strength, to which have been added 5 parts of sodium hydrosulphite, in a round bottomed flask provided with a mercury seal. The temperature of the reaction solution rises spontaneously to 60° C. and the solution becomes dark in color. The whole is then heated for 1 hour longer at 90–95° C. while stirring, and then the reaction solution is rendered weakly acid to litmus by the addition dropwise of 15 parts by volume of concentrated sulfuric acid of about 93 per cent. strength. 150 parts by volume of concentrated sodium chloride solution are then added, and the reaction mass is cooled to about 15° C. At this temperature, the whole is allowed to stand for one hour and then filtered with suction through cotton cloth.

After being dried at 80–90° C. under a pressure of 14 mm. for 16 hours the filter cake weighs 100 parts. The cake is then ground to form a pale brown powder, which is excellently suited for producing derusting baths.

For example, 50 parts of the above powder are mixed with 25 parts of calcined sodium carbonate, 15 parts of sodium hydrosulfite and 1 part of sodium diisobutyl-naphthalene sulfonate. In order to prepare a derusting bath the resulting mixture is stirred for 10 minutes with 1000 parts by volume of water. A thin layer of spindle oil is poured on to the liquid in order to preclude the harmful influence of atmospheric oxygen.

Rusty articles suspended in this bath for 10–24 hours can be withdrawn from the bath in a clean state and free from all rust.

In order to avoid the adherence of oil, it is advisable thoroughly to wet the articles to be cleaned before they are immersed in the derusting bath.

The above described pulverulent mixture may vary widely in its composition. Thus, finely ground quicklime or a powdered caustic alkali may be added in order to adjust the pH value of the solution to the purpose desired.

Thus, for example, for the purpose of cleaning metal articles which also contain aluminium constituents there are advantageously used derusting baths rendered alkaline with bicarbonate or carbonate, and, on the other hand in cases where it is desired to dissolve fat or oil paint coatings in addition to removing rust a solution rendered alkaline with caustic alkali is used.

The capacity of the above described solutions for removing rust diminishes in time but can be brought almost to its original value by a fresh addition of sodium hydrosulfite or another compound capable of reducing iron from the ferric to the ferrous state and resistant to alkali.

*Example 18*

5.0 parts of commercial ellagic acid, 5.0 parts of caustic soda and 2.0 parts of sodium hydrosulfite are dissolved in 100 parts by volume of water.

Rusty iron articles are placed in this solution, and the latter is heated at the boil for 10–15 minutes. At the end of this period all rust has been removed from the corroded surfaces.

*Example 19*

10 parts of gallic acid, 15 parts of sodium bicarbonate, 3 parts of sodium hydrosulfite and 0.5 part of sodium diisobutyl-naphthalene sulfonate are dissolved in 200 parts by volume of water.

Corroded articles of iron, when suspended in the above solution, are freed from all rust after 6–8 hours.

What I claim is:

1. A process for removing corrosion products from surfaces containing heavy metals which are resistant to the action of alkaline solutions, which comprises treating the said surfaces with an alkaline aqueous solution of a member selected from the group consisting of polyhydroxybenzenes and polyhydroxydiphenyls, each of which contains at least two adjacent hydroxy groups, and their carboxylic acids, all these compounds being free from substituents other than hydroxy and carboxylic acid groups.

2. A process for removing corrosion products from surfaces containing heavy metals which are resistant to the action of alkaline solutions, which comprises treating the said surfaces with an alkaline aqueous solution of a member selected from the group consisting of polyhydroxybenzenes and polyhydroxydiphenyls, each of which contains at least two adjacent hydroxy groups, and their carboxylic acids, all these compounds being free from substituents other than hydroxy and carboxylic acid groups, said aqueous solution also containing a reducing agent selected from the group consisting of alkali metal hydrosulfites and alkali metal hydrophosphites.

3. A process for removing corrosion products from a surface which contains iron, which comprises treating the said iron-containing surface with an alkaline aqueous solution of a member selected from the group consisting of polyhydroxybenzenes and polyhydroxydiphenyls, each of which contains at least two adjacent hydroxy groups, and their carboxylic acids, all these compounds being free from substituents other than hydroxy and carboxylic acid groups.

4. A process for removing corrosion products from a surface which contains iron, which comprises treating the said iron-containing surface with an alkaline aqueous solution of an alkali metal salt of a polyhydroxybenzene containing at least two adjacent hydroxy groups and a carboxylic acid group bound to the benzene nucleus, said polyhydroxybenzene being free from substituents other than hydroxy and carboxylic acid groups, said aqueous solution also containing a reducing agent selected from the group consisting of alkali metal hydrosulfites and alkali metal hydrophosphites.

5. A process for removing corrosion products from a surface which contains iron, which comprises treating the said iron-containing surface with an alkaline aqueous solution of an alkali metal salt of a polyhydroxybenzene containing at least two adjacent hydroxy groups and a carboxylic acid group bound to the benzene nucleus, said polyhydroxybenzene being free from substituents other than hydroxy and carboxylic acid groups, said aqueous solution also containing an alkali metal hydrosulfite.

6. A process for removing corrosion products from a surface which contains iron, which comprises treating the said iron-containing surface with an alkaline aqueous solution of an alkali metal salt of gallic acid, said aqueous solution also containing an alkali metal hydrosulfite.

7. A process for removing corrosion products from a surface which contains iron, which comprises treating the said iron-containing surface with an alkaline aqueous solution of saponified tannin, said aqueous solution also containing an alkali metal hydrosulfite.

8. A process for removing corrosion products from a surface which contains iron, which comprises treating the said iron-containing surface with an alkaline aqueous solution of pyrocatechol, said aqueous solution also containing an alkali metal hydrosulfite.

CARLO ROSSI.

REFERENCES CITED

The following references are of record in the file of this patent:

UNITED STATES PATENTS

| Number | Name | Date |
| --- | --- | --- |
| 2,257,186 | Orthner et al. | Sept. 30, 1941 |

FOREIGN PATENTS

| Number | Country | Date |
| --- | --- | --- |
| 28,863 | Australia | Feb. 18, 1931 |

Certificate of Correction

Patent No. 2,472,684.

June 7, 1949.

CARLO ROSSI

It is hereby certified that errors appear in the printed specification of the above numbered patent requiring correction as follows:

Column 1, line 11, for the word "meal" read *metal*; column 4, line 32, Example 10, for "hydosulfite" read *hydrosulfite*; line 49, Example 11, for "atack" read *attack*; column 5, line 47, Example 16, for "solidified" read *solidifies*; line 49, same example, after the word "pressure" strike out the comma and insert instead a period; and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*